United States Patent
Huang et al.

(10) Patent No.: US 10,755,072 B2
(45) Date of Patent: Aug. 25, 2020

(54) DISPLAY PANEL AND DISPLAY DEVICE

(71) Applicant: Wuhan China Star Optoelectronics Technology Co., Ltd., Wuhan, Hubei (CN)

(72) Inventors: Chunhung Huang, Hubei (CN); Yaoli Huang, Hubei (CN); Xinglong He, Hubei (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 0 days.

(21) Appl. No.: 16/308,560

(22) PCT Filed: Sep. 6, 2018

(86) PCT No.: PCT/CN2018/104426
§ 371 (c)(1),
(2) Date: Dec. 10, 2018

(87) PCT Pub. No.: WO2020/024363
PCT Pub. Date: Feb. 6, 2020

(65) Prior Publication Data
US 2020/0042763 A1    Feb. 6, 2020

(30) Foreign Application Priority Data

Aug. 2, 2018   (CN) .......................... 2018 1 0868463

(51) Int. Cl.
*G06K 9/00*  (2006.01)
*G09G 3/20*  (2006.01)
*G09G 3/34*  (2006.01)

(52) U.S. Cl.
CPC ......... *G06K 9/0004* (2013.01); *G09G 3/2007* (2013.01); *G09G 3/34* (2013.01);
(Continued)

(58) Field of Classification Search
CPC ...... G06K 9/0004; G09G 3/2007; G09G 3/34; G09G 2300/08; G09G 2310/0243;
(Continued)

(56) References Cited

U.S. PATENT DOCUMENTS 8,780,088 B2 *   7/2014   Boer ................... G06F 3/0412
                                                        178/18.09
2008/0074401 A1 *   3/2008   Chung ................ G02F 1/1368
                                                        345/175
(Continued)

*Primary Examiner* — Tom V Sheng
(74) *Attorney, Agent, or Firm* — Muncy, Geissler, Olds & Lowe, P.C.

(57) ABSTRACT

A display panel includes a transparent substrate, a visible light backlight source, an infrared backlight source, a plurality of gate lines, a plurality of display data lines, a plurality of sensing data lines, a plurality of display transistors, a plurality of display pixels, a plurality of sensing pixels, and plurality of sensing transistors. When the display transistors receive the scanning signals, the display pixels are configured to display grayscale according to the visible light and the display data signals. When the sensing transistors receive the scanning signals, the sensing pixels are configured to generate detecting signals after conducting the sensing signals to the plurality of sensing data lines. Fingerprint recognition can be implemented on the display area of display panel without extra fingerprint recognizing components so that the screen can be minimized and the smart terminals can be lighter.

8 Claims, 3 Drawing Sheets

(52) U.S. Cl.
CPC . *G09G 2300/08* (2013.01); *G09G 2310/0243* (2013.01); *G09G 2310/0264* (2013.01)

(58) Field of Classification Search
CPC ........ G09G 2310/0264; G02F 1/13338; G02F 2203/11; G02F 2203/04103; G06F 3/0421; G06F 3/0423
See application file for complete search history.

(56) References Cited

U.S. PATENT DOCUMENTS

| | | | | |
|---|---|---|---|---|
| 2009/0146992 | A1* | 6/2009 | Fukunaga | G02F 1/13338 345/214 |
| 2010/0283765 | A1* | 11/2010 | Gotoh | G06F 3/0412 345/175 |
| 2011/0007047 | A1* | 1/2011 | Fujioka | G02F 1/13338 345/207 |
| 2011/0096021 | A1* | 4/2011 | Kim | G02F 1/13338 345/174 |
| 2011/0102392 | A1* | 5/2011 | Fujioka | G02F 1/13338 345/207 |
| 2011/0157097 | A1* | 6/2011 | Hamada | G02F 1/13338 345/175 |
| 2011/0169000 | A1* | 7/2011 | Bang | G02F 1/136209 257/59 |
| 2011/0234536 | A1* | 9/2011 | Yeo | G02F 1/13338 345/175 |
| 2011/0242440 | A1* | 10/2011 | Noma | G02F 1/1336 349/1 |
| 2011/0279414 | A1* | 11/2011 | Noma | G06F 3/0412 345/102 |
| 2012/0105404 | A1* | 5/2012 | Gotoh | G06F 3/0412 345/207 |
| 2012/0287093 | A1* | 11/2012 | Gotoh | G06F 3/0412 345/204 |
| 2013/0027355 | A1* | 1/2013 | Hata | G06F 3/03545 345/175 |
| 2013/0044092 | A1* | 2/2013 | Park | G06F 3/0412 345/207 |
| 2016/0132177 | A1* | 5/2016 | Bae | G06K 9/00013 345/174 |
| 2016/0266695 | A1* | 9/2016 | Bae | G06F 1/1643 |
| 2018/0211079 | A1* | 7/2018 | Liu | G06K 9/0004 |
| 2018/0356664 | A1* | 12/2018 | Yang | H01L 27/124 |
| 2019/0018564 | A1* | 1/2019 | Chen | G06F 3/0488 |
| 2019/0333938 | A1* | 10/2019 | Wang | G02F 1/136286 |

* cited by examiner

DISPLAY PANEL AND DISPLAY DEVICE

FIELD OF INVENTION

The present disclosure relates to a display technology and, more particularly, relates to a fingerprint recognizable display panel and display device.

BACKGROUND OF INVENTION

Usage of mobile payment climbs with development of smart terminals and online payment. To prevent payment apps of smart terminal from unauthorized payment or fraud, user verification is a key function for smart terminals. Password verification, face recognizing, or fingerprint recognizing are usual verification methods. Because sampling area is smaller, the possibility of duplicate fingerprint is extremely low, and recognizing technology is simple, fingerprint recognizing are widely utilized in user verification.

Fingerprint recognizing units disposed on smart terminal are most used method to obtain the image of fingerprint. The fingerprint recognizing units are disposed on front frames of the display panels, but nowadays, some fingerprint recognizing units are disposed on back surface of the display panels or order to make bezels narrower. When fingerprint recognizing unit are disposed on the back surface of the display panels, users have to put their finger on a specific area which causes inconvenience for users during verification process.

Please refer to FIG. 1, which illustrates a structure of a present smart terminal 10. The smart terminal includes display panel 110 and fingerprint recognizing unit 120. The display panel 110 includes a plurality of gate lines 112 and a plurality of data lines 114. The horizontal gate lines 112 and vertical data lines 114 define a plurality of pixel units 116. The pixel units 116 include red (R) pixel units 116R, green (G) pixel units 116G, and blue (B) pixel units 116B.

In the present smart terminal 10, the fingerprint recognizing unit 120 is disposed on the non-display area (i.e. bezel) of display screen. Alternately, the fingerprint recognizing unit 120 can be disposed on the back surface of the smart terminal 10 so that the display area can occupy all the space of front surface of display screen. However, no matter the fingerprint recognizing unit 120 is dispose on the non-display area (i.e. bezel) of display screen or the back surface of the display panel, additional recognizing components and additional circuit for transmitting detected fingerprint data are required. Therefore, additional space for recognizing components and circuit is required which obstruct minimization of panel thickness. Besides, users have to put their finger on specific area of fingerprint recognizing unit 120 for recognizing fingerprint, this cause inconvenient for users during verification process.

SUMMARY OF INVENTION

The present disclosure provides a display panel and display device which can implement fingerprint recognition on the display area of display panel without extra fingerprint recognizing components. Therefore, users can put their finger whenever they want on the display panel rather than put their finger in specific area of fingerprint recognizing components. Thus, the convenience and usage experience are enhanced. In the meanwhile, space for extra circuit of fingerprint recognizing components is saved so that the thickness of screen can be minimized and the smart terminals can be lighter.

The present disclosure provides a display panel comprises a transparent substrate, a visible light backlight source, an infrared backlight source, a plurality of gate lines, a plurality of display data lines, a plurality of sensing data line, a plurality of display transistors, a plurality of display pixels, a plurality of sensing pixels, a plurality of sensing transistors. The visible light backlight source is configured to emit visible light. The infrared backlight source is configured to emit infrared light. The gate lines are configured to transmit scanning signals. The data lines are configured to transmit display data signals. The sensing data lines are configured to transmit sensing signals. The display transistors electrically are coupled to the plurality of gate lines and the plurality of display data lines, and configured to conduct the display data signals when receiving the scanning signals. The display transistors comprise display gates, display sources and display drains. The display pixels are electrically coupled to the display drains and configured to display grayscale according to the visible light and the display data signals. The sensing pixels are configured to generate detecting signals according to intensity of reflected infrared light reflected from the transparent substrate. The sensing transistors are electrically coupled to the sensing pixels, the plurality of sensing data lines and the plurality of gate lines, and configured to conduct the sensing signals to the plurality of sensing data lines when receiving the scanning signals.

The present disclosure provides a display device comprises display panel, display driving circuit and detecting chip. The display driving circuit is configured to generate scanning signals and display data signals. The detecting chip is configured to generate sensing signals. The display panel comprises a transparent substrate, a visible light backlight source, an infrared backlight source, a plurality of gate lines, a plurality of display data lines, a plurality of sensing data line, a plurality of display transistors, a plurality of display pixels, a plurality of sensing pixels, a plurality of sensing transistors. The visible light backlight source is configured to emit visible light. The infrared backlight source is configured to emit infrared light. The gate lines are configured to transmit scanning signals. The data lines are configured to transmit display data signals. The sensing data lines are configured to transmit sensing signals. The display transistors electrically are coupled to the plurality of gate lines and the plurality of display data lines, and configured to conduct the display data signals when receiving the scanning signals. The display transistors comprise display gates, display sources and display drains. The display pixels are electrically coupled to the display drains and configured to display grayscale according to the visible light and the display data signals. The sensing pixels are configured to generate detecting signals according to intensity of reflected infrared light reflected from the transparent substrate. The sensing transistors are electrically coupled to the sensing pixels, the plurality of sensing data lines and the plurality of gate lines, configured to conduct the sensing signals to the plurality of sensing data lines when receiving the scanning signals, and configured to transmit the detecting signals to the detecting chip.

The display panel comprises a buffer insulation layer, a gate insulation layer, an interlayer dielectric layer, a planarizing layer, a common electrode layer, an outer dielectric layer. The buffer insulation layer is disposed on the visible light backlight source and the infrared backlight source. The display gates and the sensing gates are disposed on the buffer insulation layer. The buffer insulation layer comprises a plurality of conductive light-block units disposed between a passivation layer and an outer dielectric layer and configured to prevent light emitting from the infrared backlight source to the plurality of sensing pixels. The plurality of sensing pixels electrically coupled to sensing drains through the conductive light-block units. The gate insulation layer is disposed on the buffer insulation layer and configured to insulate display gates and sensing gates. Display sources and display drains are disposed on the display gates, the sensing sources and the sensing drains are disposed on the sensing gates. The interlayer dielectric layer is configured to insulate the display sources, the display drains, the sensing sources, and the sensing drains. The planarizing layer is disposed on the interlayer dielectric layer. The common electrode layer is disposed on the planarizing layer. The outer dielectric layer is disposed between a passivation layer and the common electrode layer. The display pixel couples to the display drain by penetrating through the passivation layer, the outer dielectric layer, the common electrode layer and the planarizing layer.

Preferably, the sensing pixels are composed by infrared light-emitting material.

Preferably, the buffer insulation layer comprises a plurality of conductive light-block unit disposed between the passivation layer and an outer dielectric layer and configured to prevent light emitting from the infrared backlight source to the plurality of sensing pixels, the plurality of sensing pixel electrically coupled to the sensing drain through the conductive light-block units.

Preferably, the sensing pixel couples to the conductive light-block units by penetrating through the passivation layer, the conductive light-block unit comprises an outer part penetrating through the common electrode layer, the planarizing layer and the interlayer dielectric, the sensing pixel couples to the sensing drain through the conductive light-block unit.

The display panel of the present disclosure utilizes data lines of pixel units to feedback detected electric current to a detecting chip so that additional fingerprint recognizing units and circuits are not required anymore. By utilizing the display panel of the present disclosure, additional space for disposing fingerprint recognizing units are not required, therefore, the bezel of display panel can be narrower and the thickness of display panel can be thinner. In the meanwhile, user can put their finger wherever on the display panel for fingerprint recognition. Thus, usage experience of smart terminal can be enhanced.

DETAILED DESCRIPTION OF PREFERRED EMBODIMENTS

The following content detail introduces a display panel and a display device of the present disclosure with drawings. Obviously, mentioned embodiments are just some, instead of all, examples of the present disclosure. Any modification and variation which can be completed without creative effort by a skilled person in the art on the basis of the specification should fall into the scope of the claims protected by the present disclosure.

Figure 1:
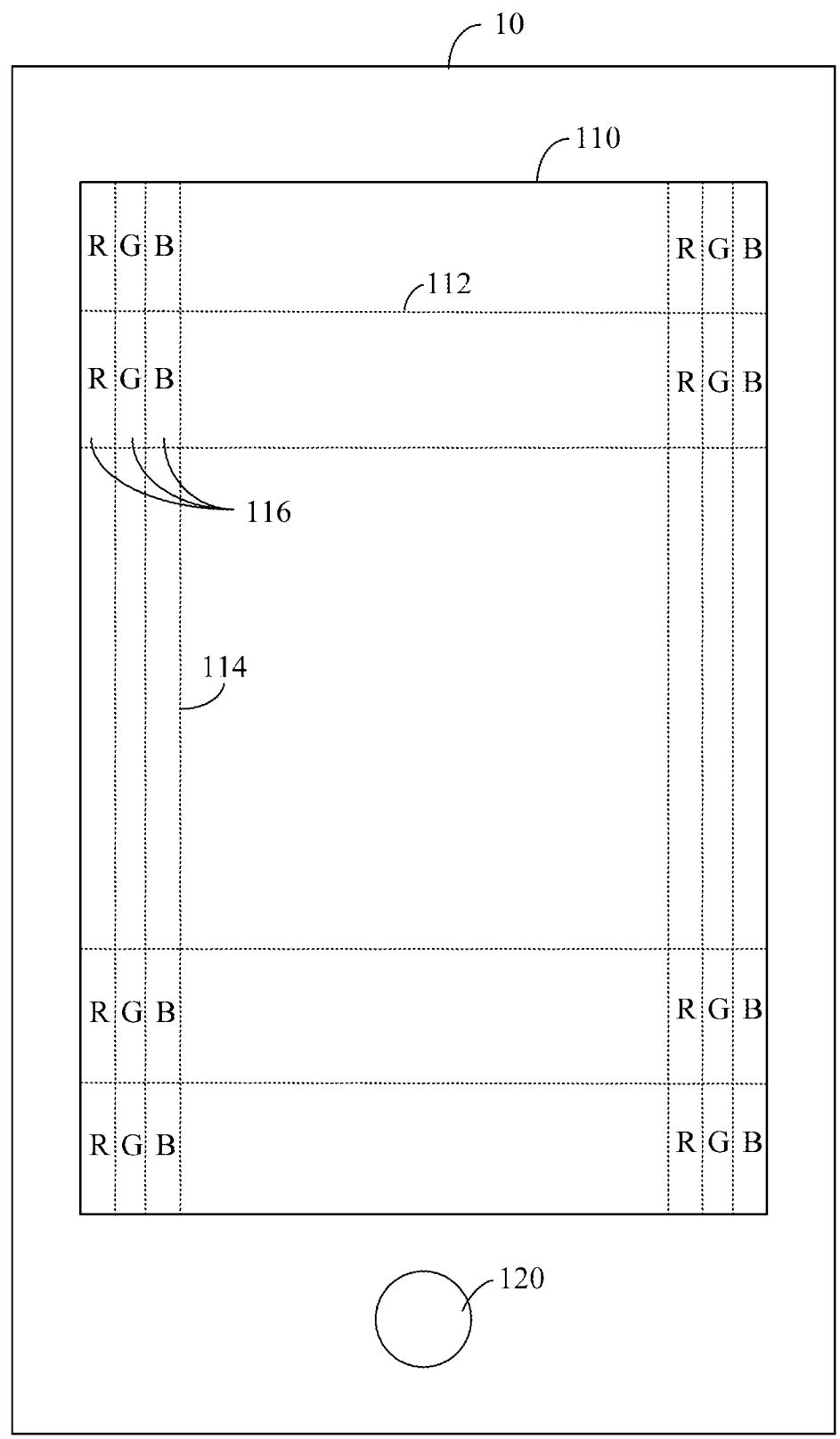
FIG. 1 illustrates a structure of the present display panel.
Figure 2:
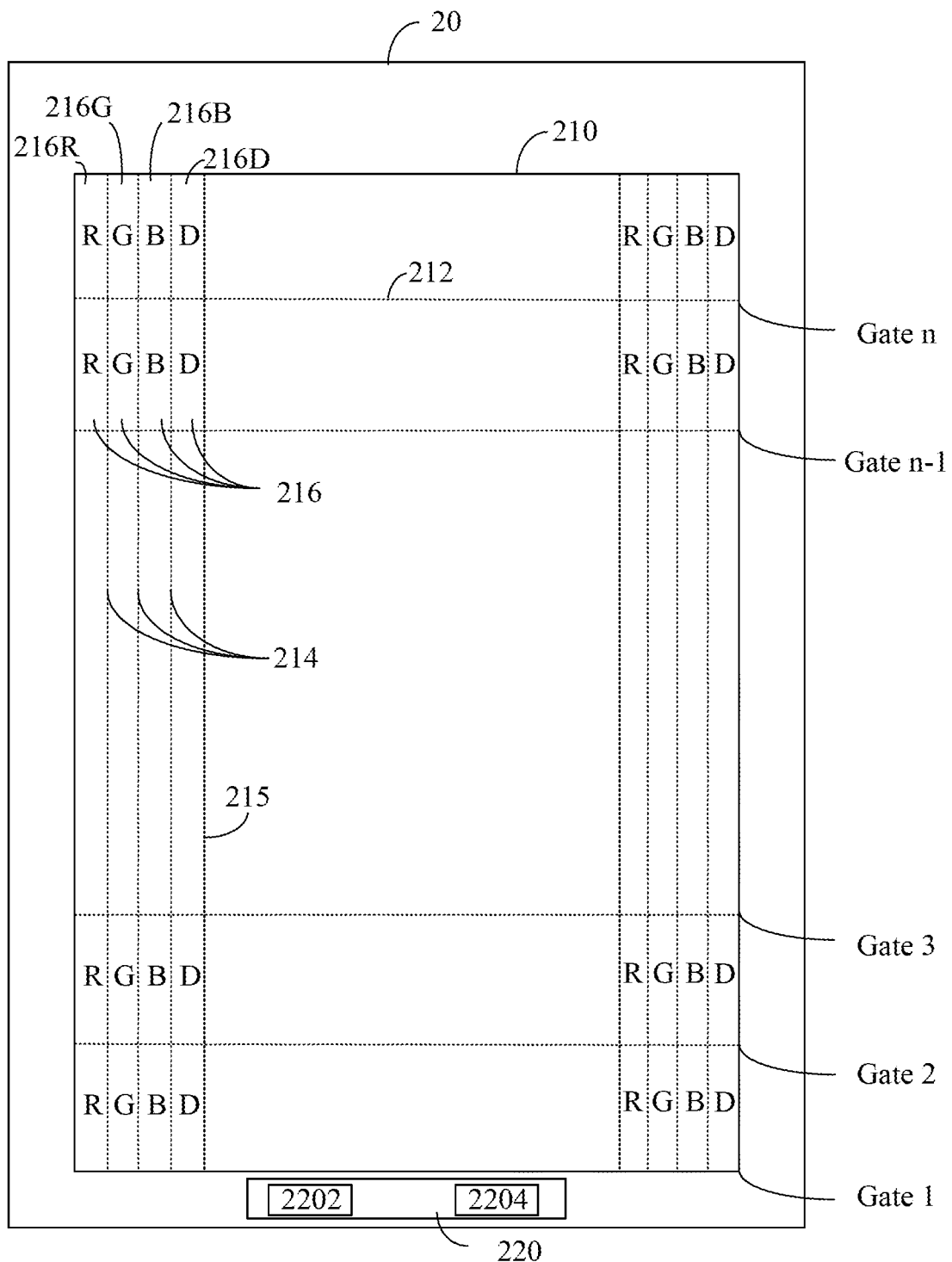
FIG. 2 illustrates a structure of a display device of the present disclosure.

FIG. 2 illustrates a structure of a display device 20 of the present disclosure. The display device 20 of the present disclosure includes a display panel 210. The display panel 210 includes a control unit 220, a plurality of gate lines 212, a plurality of display data lines 214, and a plurality of sensing data lines 215. The gate lines 212 intersect with vertical display data lines 214 and sensing data lines 215 to define a plurality of pixel units 216. In the display panel 210 of the present disclosure, pixel units 216 include display pixels and sensing pixels 216D, where the display pixels include red pixels 216R, green pixels 216G, and blue pixels 216B. The sensing pixels 216D are utilized to receive lights and transfer luminous energy to electric current. The electric current is sent to the sensing data lines 215 connected with the sensing pixels 216D. The control unit 220 includes display driving circuit 2202 and detecting chip 2204. The display driving circuit 2202 is utilized to generate display data signals and transmit the display data signals to display pixels through the display data lines 214. The detecting chip 2204 is utilized to generate sensing signals and transmit the sensing signals to sensing pixels through the sensing data lines 215. In the embodiment of the present disclosure, the pixel units 215 can be arranged in different pattern according to display and sensing requirement. For example, the order of pixel unit 216 as shown in FIG. 2 is red pixel 216R, green pixel 216G, blue pixel 216B, and sensing pixel 216D (i.e. R-G-B-D). If preferring better display quality, the arrangement of the pixel units 216 can be only one sensing pixel 216D between two groups of red pixel 216R, green pixel 216G, and blue pixel 216B. (i.e. R-G-B-R-G-B-D). If preferring better touch detection sensitivity, the arrangement of the pixel units 216 can be one sensing pixel 216D between two display pixels. (i.e. R-G-D-B-R-D-G-B-D). These above-mention arrangements of pixel units 216 are just example to illustrate the idea of the present disclosure rather than limit the present disclosure. Any modification or variation of the embodiment of the present disclosure falls into the protecting scope of the present disclosure.

In the display panel 210, pixel units disposed on the same line are connected to the same gate line 212. In other words, red pixels 216R, green pixels 216G and blue pixels on the same line are connected to the same gate line 212. Pixel units 216 disposed on the same row are connected to the same display data line 214 or sensing data line 215. Take the present embodiment shown in FIG. 2 as example, red pixels 216R disposed on the same line, green pixels 216G disposed on the same line and blue pixels disposed on the same row are connected to three display data lines 214. The sensing pixel 216D disposed on the same row are connected to the same sensing data line 215.

Figure 3:
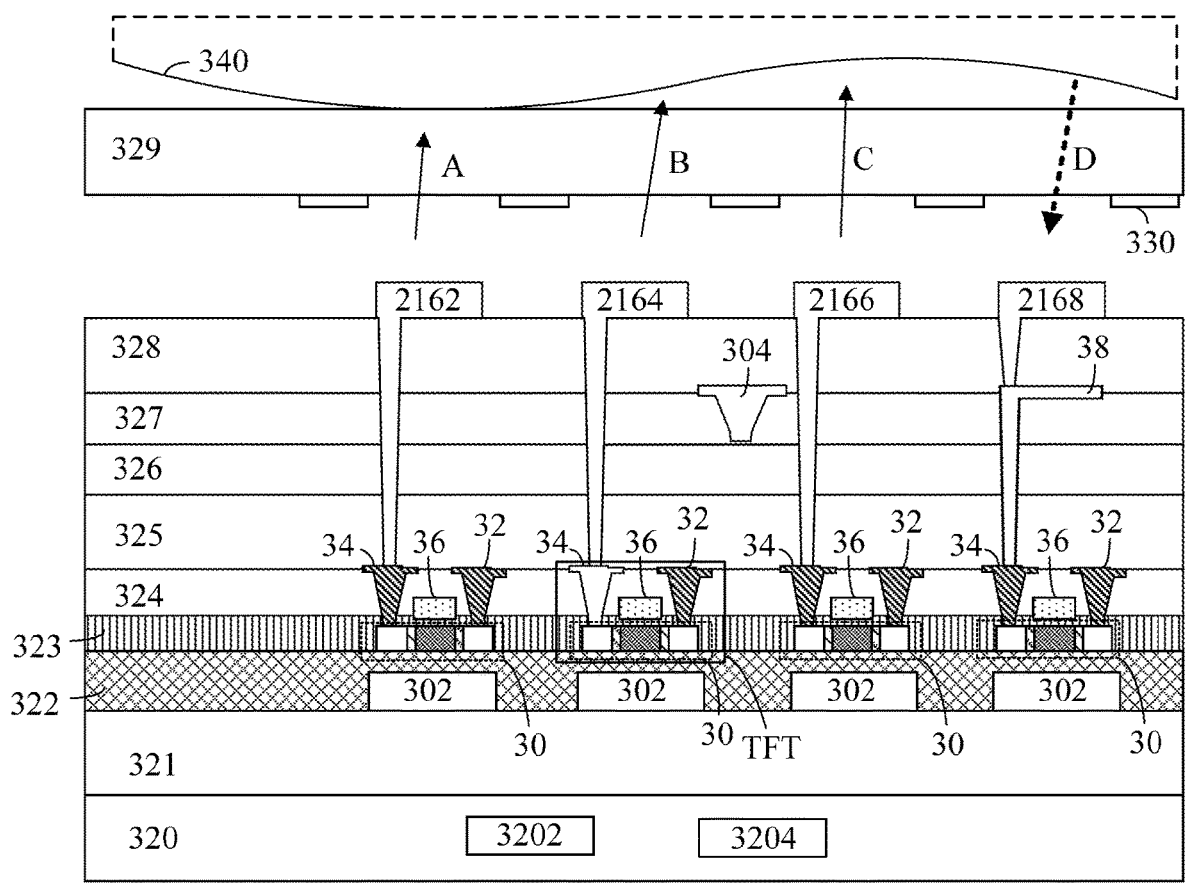
FIG. 3 illustrates a structure of a display panel of the present disclosure.

Please refer to FIG. 3 which illustrates a structure of display panel 210. The display panel 210 includes a backlight layer 320, a glass substrate 321, a buffer insulation layer 322, a gate insulation layer 323, an interlayer dielectric 324, a planarization layer 325, a common electrode layer 326, an outer dielectric layer 327, a passivation layer 328, a transparent substrate 329, and a black matrix 330. The backlight layer 320 includes a visible light backlight source 3202 configured to illuminate visible light and an infrared backlight source configured to illuminate infrared light. The red pixel 216R is composed of a red pixel electrode 2162 and a thin-film transistor (TFT, herein, the TFT of the red pixel 216R is a display transistor). The green pixel 216G is composed of a green pixel electrode 2166 and a thin-film transistor (TFT, herein, the TFT of the green pixel 216G is a display transistor). The blue pixel 216B is composed of a blue pixel electrode 2166 and a thin-film transistor (TFT, herein, the TFT of the blue pixel 216B is a display transistor). The sensing pixel 216D is composed of a sensing pixel electrode 2168 and a thin-film transistor (TFT, herein, the TFT of the sensing pixel 216B is a sensing transistor). The TFTs include a gate 30, a source 32, and a drain 314. The red pixel electrode 2162, the green pixel electrode 2164, and the blue pixel electrode 2166 are connected to drains 34 by penetrating through the passivation layer 328, the outer dielectric layer 327, common electrode layer 326, and planarization layer 325. The display panel 210 further includes metal line 36 and metal block 302. The gate lines 212 consist of the metal lines 36. The metal block 302 is utilized to block the visible light from backlight layer in order to prevent the display color of pixel units 216 (including the red pixels 216R, the green pixels 216G, and the blue pixels 216B) from affection due to visible light. The display panel 210 can also include conductive block 38 and reflection block 304 which are utilized to prevent the sensing pixels 2168 from affection resulted from the infrared light generated from the infrared backlight source 3204 in backlight layer 320. The conductive block 38 is also utilized to transmit the electric current generated by the sensing pixel electrode 2168 to the drain 34 of TFT. The sensing pixel electrode 2168 penetrates through the passivation layer 2168. The conductive block 38 is disposed between the passivation layer 328 and the outer dielectric layer 327 and has a similar width as the sensing pixel electrode 2168 in order to present the sensing pixel electrode 2168 from the affection of infrared light generated from infrared backlight source 3204. In addition, the conductive block 38 further includes an extension part connected to the drain 34 of sensing TFT by penetrating through the outer dielectric 327, the common electrode layer 326, and the planarization layer 325. The black matrix 330 is utilized to prevent grayscale of the display panel 210 from the affection of lights from backlight layer 320.

The control unit 220 controls the voltage potential transmitted to the gate lines 212 and the data voltage, which is generated from display driving circuit 2202, transmitted to display data lines 214. The control unit 220 can include display driving circuit 2202 and detecting chip 2204. The display driving circuit 2202 transmits high voltage potential to gate lines 212 in sequence and transmits corresponding display data signals to display data lines 214. The detecting chip 2204 transmits the sensing signals to sensing pixels 216D and reads detecting signals which are feedback from sensing data lines 215. The control unit 220 controls gate lines Gate 1 to Gate n to receive high voltage potential sequentially and makes the rest of gate lines remain in low voltage potential. The control unit 220 makes the display driving circuit 2202 transmits corresponding display voltage (i.e. display data signals) to the red pixels 216R, the green pixels 216G, and the blue pixels 216B through the corresponding display data lines 214. The detecting chip 2204 transmits the sensing signals to the sensing pixels 216D through the corresponding sensing data lines 215. In the present disclosure, the detecting chip 2204 can be embed as a single chip with the display driving circuit 2202, or can be an independent chip isolated from driving circuit 2202.

The fingerprint detecting method of the present disclosure utilized the reflected luminous energy to determine the image of fingerprint. When fingers put on the display panel 210, lights generated from backlight layer 320 are reflected to the sensing pixel electrode 2168. Because fingerprints have concave and convex veins, each of the sensing pixels 216D will generate various current corresponding to the different strength of the reflected luminous energy. Take FIG. 3 as an example, backlight layer 320 emitting visible light and infrared light. The visible light is utilized to display, the red pixel electrode 2162, green pixel electrode 2164, and blue pixel electrode 2166 display corresponding grayscales according to the display data signals conducted from TFTs of display pixels. The red pixel 216R, the green pixel 216G, and the blue pixel 216B generate lights A, B, and C. The infrared generated from backlight layer 320 penetrates through the transparent substrate 329 and reflects light D due to the finger. The sensing pixel electrode 2168 which is composed of photoionization material will generate electric current corresponding to the concave and convex veins of fingerprint. The sensing pixel electrode 2168 can be composed by infrared photoionization material such as a-silicon GaAs. The electric current generated by the sensing pixel electrodes 2168 is transmitted to detecting chip 2204 through the sensing data lines 215 connected to the sensing pixel electrodes 2168. In other words, electric current generated according to light D feedback to the detecting chip 2204 through sensing data lines 215. The concave part of fingerprint reflect more luminous light than convex part, thus sensing pixel electrode 2168 disposed in concave area will generate larger electric current than sensing pixel electrode 2168 disposed in convex area. Therefore, detecting chip 2204 computes the image of fingerprint according to the electric current generated by sensing pixel electrode 2168 in display panel 210. The detecting chip 2204 can further compares the detected fingerprint with stored data base of fingerprint to implement user verification.

The particular execute flow of the display panel are as follows.

First, the control unit 220 transmits a high voltage potential to the first line of gate line 212 (Gate 1), thus the TFT of the first line of pixel unit 216 is on while other gate lines (Gate 2-n) receive low voltage potential. As a result, the TFTs of pixel units 216 of Gate 2 to Gate n are off. Preferably, the high voltage potential is 6V to 12 V and the low voltage potential is −9V to −7V. When the first gate line 212 (Gate 1) receives high voltage potential, display driving circuit 2202 transmits corresponding work voltages to the first line of red pixel 2162, green pixel 2164, and blue pixel 2166 through corresponding display data lines 214. The detecting chip 2202 reads the electric current from the first line of sensing pixel electrode 2168. In other words, the detecting chip 2202 reads the electric current of the first line of sensing data lines 215. When the control unit 220 is composed of display driving circuit 2202 and detecting chip 2204, after the TFTs of the first line of pixel units 216 are turned on due to the high voltage potential, the display driving circuit 2202 transmit corresponding voltages to the first line of red pixel 2162, green pixel 2164, and blue pixel 2166, while the detecting chip 2204 reads detecting signals (the value of electric current) generated by the first line of sensing pixel 216D through the sensing data lines 215.

Second, the control unit transmits a high voltage potential to the first line of gate line 212 (Gate 2) and transmits low voltage potentials to the other lines of gate lines (Gate1, Gate 3-n). Thus, the TFT of the second line of pixel units 216 are on. The display driving circuit 2202 transmits corresponding work voltages to the second line of red pixel 2162, green pixel 2164, and blue pixel 2166, while detecting chip 2204 reads values of electric current from the sensing data lines 215 connected to the second line of sensing pixel electrodes 2168.

Similarly, the control unit 220 transmits high voltage potentials to the gate lines 212 in sequence to make each line of the TFTs on to transmit word voltage to display pixels (red pixel 2162, green pixel 2164, and blue pixel 2166) through the corresponding display data lines 214, and read the detecting signals generated by each line of sensing pixel electrode 2168 through the corresponding sensing data lines 215. After each of gate lines 212 (Gate 1-n) receive high voltage potential, the detecting chip 2204 computes the image of fingerprint according to the detecting signals generated from each lines of sensing pixel electrode 2168 and compares the obtained fingerprint with verified data base to determine whether the user using smart terminal 20 is authorized person or not.

The present disclosure includes a display device including the above-mentioned display panel 210, a display driving circuit 2202 and a detecting chip 2204. The display driving circuit 2202 is utilized to generate scanning signals (high or low voltage potential) and display data signals. The detecting chip 2202 is utilized to generate sensing signals. Display pixels 216R, 216G 216B are utilized to display corresponding visible grayscale according to the scanning signals and display data signals generated by display driving circuit 2202. The sensing pixels 216D are utilized to feedback detecting signals generated by the sensing pixel electrode 2168 to the detecting chip 2204. The detecting chip computes the image of fingerprint after receives feedback from every lines of sensing pixel 216D and compares the obtained fingerprint image with fingerprints stored in data base to implement user verification in order to determine whether the user can access to the function of smart terminal 20 or not.

The display panel and fingerprint recognizable display device do not require extra fingerprint recognizing components to implement fingerprint recognition. In comparison with the present technology, by changing the structure of pixel units with the gate lines, data lines and pixel unit of present display panels and display devices, the changed pixel units can generate electric current according to the luminous energy by utilizing photoionization material. Furthermore, the generated electric current can feedback the detecting chip to calculate the image of fingerprint without extra fingerprint recognizing components. Therefore, usage experiences are enhanced.

The above-mentioned embodiments are preferable embodiments of the present disclosure. Any modification and variation which can be completed without creative effort by a skilled person in the art on the basis of the specification should fall into the scope of the claims protected by the present disclosure.

What we claim is:

1. A display panel, comprising:
 a transparent substrate;
 a visible light backlight source configured to emit visible light;
 an infrared backlight source configured to emit infrared light;
 a plurality of gate lines configured to transmit scanning signals;
 a plurality of display data lines configured to transmit display data signals;
 a plurality of sensing data lines configured to transmit sensing signals;
 a plurality of display transistors electrically coupled to the plurality of gate lines and the plurality of display data lines, and configured to conduct the display data signals when receiving the scanning signals, wherein the plurality of display transistors comprise display gates, display sources, and display drains;
 a plurality of display pixels electrically coupled to the display drains and configured to display grayscale according to the visible light and the display data signals;
 a plurality of sensing pixels configured to generate detecting signals according to intensity of reflected infrared light reflected from the transparent substrate;
 a plurality of sensing transistors electrically coupled to the sensing pixels, the plurality of sensing data lines and the plurality of gate lines, and configured to conduct the sensing signals to the plurality of sensing data lines when receiving the scanning signals, wherein the plurality of sensing transistors comprise sensing gates, sensing sources, and sensing drains;
 a buffer insulation layer disposed on the visible light backlight source and the infrared backlight source, wherein the display gates and the sensing gates are disposed on the buffer insulation layer, a plurality of conductive light-block units are disposed between a passivation layer and an outer dielectric layer and are configured to prevent the infrared backlight source from being read by the plurality of sensing pixels, and the plurality of sensing pixels are electrically coupled to the sensing drains through the conductive light-block units;
 a gate insulation layer disposed on the buffer insulation layer and configured to insulate the display gates and the sensing gates, wherein the display sources and the display drains are disposed on the display gates, the sensing sources, and the sensing drains are disposed on the sensing gates; and
 an interlayer dielectric configured to insulate the display sources, the display drains, the sensing sources, and the sensing drains.

2. A display panel, comprising:
 a transparent substrate;
 a visible light backlight source configured to emit visible light;
 an infrared backlight source configured to emit infrared light;
 a plurality of gate lines configured to transmit scanning signals;
 a plurality of display data lines configured to transmit display data signals;
 a plurality of sensing data lines configured to transmit sensing signals;
 a plurality of display transistors electrically coupled to the gate lines and the display data lines, and configured to conduct the display data signals when receiving the scanning signals, wherein the display transistor comprises a display gate, a display source, and a display drain;
 a plurality of display pixels electrically coupled to the display transistors and configured to display grayscale according to the visible light and the display data signals;
 a plurality of sensing pixel configured to generate detecting signals according to intensity of reflected infrared light reflected from the transparent substrate;
 a plurality of sensing transistors electrically coupled to the sensing pixel, the sensing data lines and gate lines, and configured to conduct the sensing signals to the sensing data lines, wherein the sensing transistor comprises a sensing gate, a sensing source, and a sensing drain;
 a buffer insulation layer disposed on the visible light backlight source and the infrared backlight source, wherein the display gate and the sensing gate are disposed on the buffer insulation layer, wherein a plurality of conductive light-block units are disposed between a passivation layer and an outer dielectric layer and are configured to prevent the infrared backlight source from being read by the plurality of sensing pixels, the plurality of sensing pixels are electrically coupled to the sensing drains of the plurality of sensing transistors through the conductive light-block units;

a gate insulation layer disposed on the buffer insulation layer and configured to insulate the display gate and the sensing gate, wherein the display source and the display drain are disposed on the display gate, the sensing source and the sensing drain are disposed on the sensing gate; and an interlayer dielectric layer configured to insulate the display source, the display drain, the sensing source, and the sensing drain;

a planarizing layer disposed on the interlayer dielectric layer;

a common electrode layer disposed on the planarizing layer; and an outer dielectric layer disposed between a passivation layer and the common electrode layer;

wherein the display pixels are electrically coupled to the display drains by penetrating through the passivation layer, the outer dielectric layer, the common electrode layer and the planarizing layer.

3. The display panel according to claim 2, wherein the sensing pixels are composed by infrared light-sensing material.

4. The display panel according to claim 2, wherein the sensing pixels are coupled to the conductive light-block units by penetrating through the passivation layer, each of the conductive light-block units comprises an extending part penetrating through the common electrode layer, the planarizing layer and the interlayer dielectric, the sensing pixels are coupled to the sensing drains through the conductive light-block units.

5. A display device comprising:
   a display driving circuit configured to generate scanning signals and display data signals;
   a detecting chip configured to generate sensing signals;
   a display panel comprising:
      a transparent substrate;
      a visible light backlight source configured to emit visible light;
      an infrared backlight source configured to emit infrared light;
      a plurality of gate lines configured to transmit a scanning signals;
      a plurality of display data lines configured to transmit display data signals;
      a plurality of sensing data lines configured to transmit sensing signals;
      a plurality of display transistors electrically coupled to the gate lines and the display data lines, and configured to conduct the display data signals when receiving the scanning signals, wherein the display transistor comprises a display gate, a display source, and a display drain;
      a display pixels electrically coupled to the display transistors and configured to display grayscale according to the visible light and the display data signals;
      a sensing pixel configured to generate detecting signals according to intensity of reflected infrared light reflected from the transparent substrate;
      a plurality of sensing transistors electrically coupled to the sensing pixels, the sensing data lines and gate lines, and configured to conduct the sensing signals to the sensing data lines, and configured to transmit the detecting sensing signals to the detecting chip through the sensing data lines wherein the sensing transistor comprises a sensing gate, a sensing source, and a sensing drain;
      a buffer insulation layer disposed on the visible light backlight source and the infrared backlight source, wherein the display gate and the sensing gates are disposed on the buffer insulation layer, wherein a plurality of conductive light-block units are disposed between a passivation layer and an outer dielectric layer and are configured to prevent the infrared backlight source from being read by the plurality of sensing pixels, the plurality of sensing pixels electrically coupled to the sensing drains of the plurality of sensing transistors through the conductive light-block units;
      a gate insulation layer disposed on the buffer insulation layer and configured to insulate the display gates and the sensing gates, wherein the display source and the display drain are disposed on the display gates, the sensing source and the sensing drain are disposed on the sensing gates;
      an interlayer dielectric layer configured to insulate the display source, the display drain, the sensing source, and the sensing drain;
      a planarizing layer disposed on the interlayer dielectric layer; and
      a common electrode layer disposed on the planarizing layer;
   wherein the display pixel couples to the display drain by penetrating through the passivation layer, the outer dielectric layer, the common electrode layer and the planarizing layer, and the detecting chip is configured to distinguish an image of an object contacting the display panel according to the detecting signal.

6. The display device according to claim 5, wherein the sensing pixels are composed by infrared light-sensing material.

7. The display device according to claim 5, wherein the a plurality of conductive light-block unit disposed between the passivation layer and an outer dielectric layer and configured to prevent the infrared backlight source from being read by the plurality of sensing pixels, the plurality of sensing pixel electrically coupled to the sensing drain through the conductive light-block units.

8. The display device according to claim 5, wherein the sensing pixel couples to the conductive light-block units by penetrating through the passivation layer, the conductive light-block unit comprises an outer part penetrating through the common electrode layer, the planarizing layer and the interlayer dielectric, the sensing pixel couples to the sensing drain through the conductive light-block unit.

* * * * *